Aug. 24, 1965  A. C. SCHUSTER  3,202,228
DRILL APPARATUS AND DRILL BIT FOR ENLARGING APERTURES
Filed Jan. 30, 1963  2 Sheets-Sheet 1
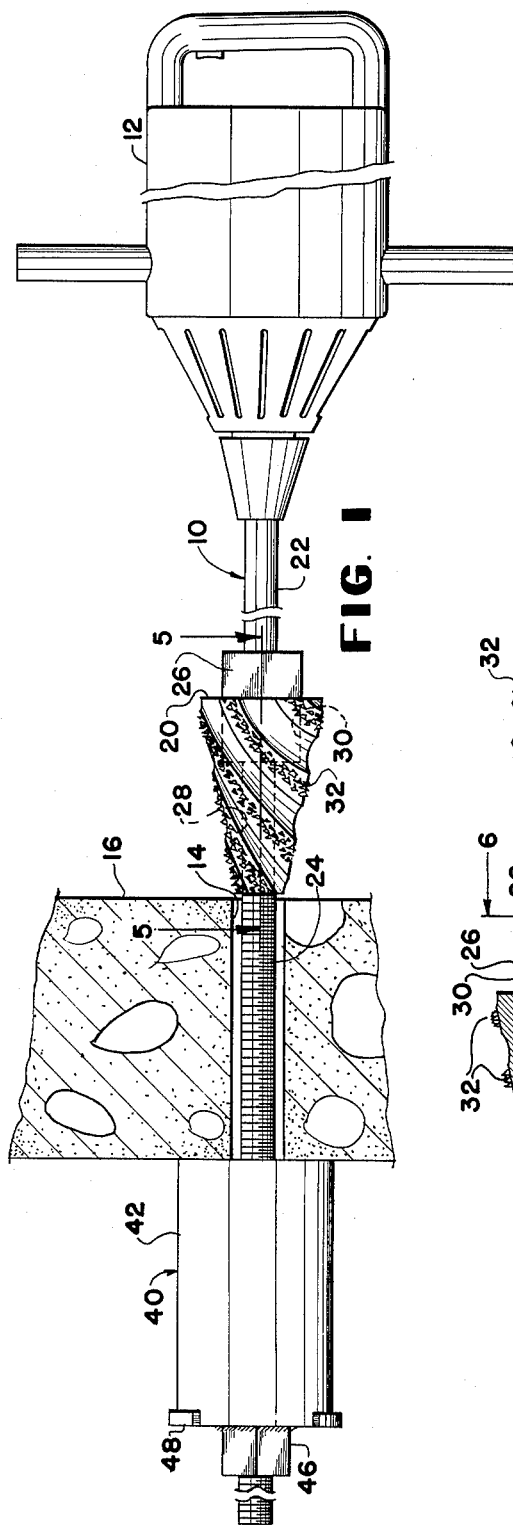
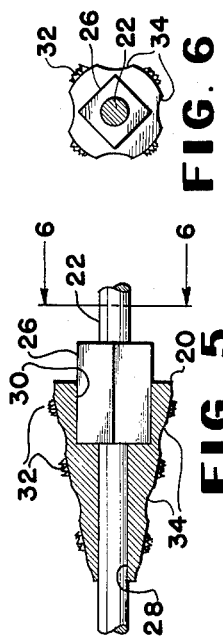
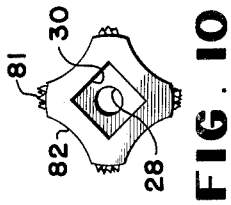
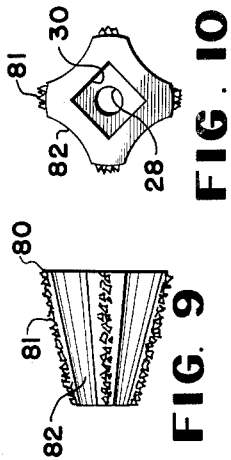
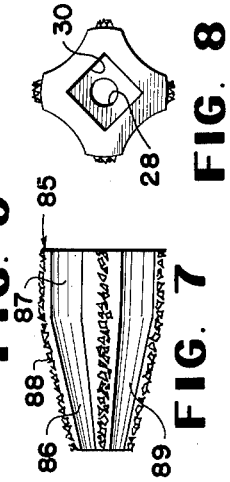
INVENTOR.
ALLAN C. SCHUSTER
BY
John H. Widdowson
ATTORNEY Aug. 24, 1965 A. C. SCHUSTER 3,202,228
DRILL APPARATUS AND DRILL BIT FOR ENLARGING APERTURES
Filed Jan. 30, 1963 2 Sheets-Sheet 2

INVENTOR.
ALLAN C. SCHUSTER
BY John H. Widdowson
ATTORNEY 3,202,228
DRILL APPARATUS AND DRILL BIT FOR ENLARGING APERTURES
Allan C. Schuster, Hutchinson, Kans.
(707 E. 66th Terrace N., Kansas City, Mo.)
Filed Jan. 30, 1963, Ser. No. 254,910
17 Claims. (Cl. 175—53)

This invention relates to drilling. In a more specific aspect, this invention relates to drilling apparatus for enlarging apertures in a masonry wall or the like. More specifically, this invention relates to drilling apparatus adapted to feed and align a cutting means. In another aspect, this invention relates to cutting bit means. More specificially, this invention relates to a cutting bit means adapted for use with a drilling apparatus to enlarge a hole in a masonry wall or the like. Still more specifically, the invention relates to a cutting bit means adapted to be disposed on the tang of a drilling apparatus and provided with rows of carbide particles fluxed to the surface of the cutting bit means, and having shallow grooves disposed between the rows of carbide particles. The invention relates to a drill bit and drilling apparatus that is adapted for drilling in masonry walls of varying degrees of hardness and thickness.

Drilling apparatus adapted to drill and/or enlarge holes in masonry walls or the like are known in the art. These known drilling apparatus consist generally of a cutting bit provided with a tough, hard cutting edge, and a suitable power means, as for example an electric drill. The cutting edge in some instances is a carbide insert fixed to the bit. These known masonry drilling apparatus are difficult to operate and of limited application. In operation, it is necessary that a force be applied to the rotating cutting means in order to force it against and into the wall or the like being drilled. This force is usually applied manually by the operator. The operation is exceedingly difficult and tedious, particularly, if the apertures being drilled are large, or the drilling operation is performed on a scaffold or the like. The larger the holes being drilled, the more force must be applied to the bit. There is a physical limit to the amount of force that a workman can apply. Applying a force to a vibrating, cumbersome, heavy drill often in an awkward position is a severe strain on the endurance of the operator. The difficulty is further magnified when the operation is undertaken on a scaffold or some other unsteady platform. Further, if the drilling operation is performed at high altitudes, there is a danger that the workman could be forced or thrown off the scaffold and injured by a drill bit hitting a hard object in the wall and sticking. The material of the wall usually varies, depending on the aggregate used, the hardness of the concrete, and possibly the number and placement of reinforcing rods disposed within the wall. When the drilling bit of a drilling apparatus known to the prior art encounters a hard object as for example, a reinforcing rod, the operation requires more pressure against the drill bit. Further, the drill bit may stick or freeze in the wall possibly turning the drill and causing the operator to fall. Further, the encountering of the hard object in the wall by the drill bit can misalign the aperture being drilled causing further complications. In summary, the drilling apparatus known to the prior art does not have a satisfactory means for supporting the drilling apparatus, feeding the bit into the wall as a hole is being drilled, and/or does not have the satisfactory means for maintaining an alignment of the drill bit.

In regard to the drilling bits known to the prior art, these bits are expensive, do not have an efficient means to clean the cuttings from between the bit and the hole being drilled, and have no satisfactory means of maintaining an alignment when enlarging an existing hole in a wall. The material dislodged by the bit often cakes up in and around the bit subsequently locking or freezing the bit in the hole in the wall. When this occurs it is a serious annoyance which can under certain conditions have dire consequences.

I have invented a new drilling apparatus. The drilling apparatus of my invention has an operating and guiding means having a feeding portion. Preferably, the operating and guiding means is a threaded elongated rod. Attachment means are provided on said operating and guiding means. Preferably, the attachment means consists of the non-circular tang. A cutting means having end portions of different sizes and having means therewith constructed and adapted to operatively engage said attachment means is provided. Preferably, the attachment means is a tang, and said means adapted to operatively engage same is a non-circular counterbore in said cutting means. A feed means including means adapted to operatively engage said feeding portion of said operating and guiding means is also provided. Preferably, the feed means consists of a threaded means, more preferably, a threaded nut supported in spaced relationship to a wall or the like being drilled by my drilling apparatus.

The new cutting bit of my invention has an element with one end portion reduced in size, preferably, the element is frusto-conical in shape. The element has a longitudinal bore and an attachment means associated with said bore. Preferably, the attachment means is a non-circular counterbore. Cutting edge means are secured to the surface of the element. Preferably the cutting edge means is one or more rows of carbide particles fluxed to the surface.

The drilling apparatus of my invention overcomes all of the problems associated with drilling apparatus of the prior art. My drilling apparatus is provided with a means to positively feed the cutting means into the wall as the cutting means is rotated. Further, the rate of feed can be varied by interchanging the feed rods having a different pitch. For example, if during the drilling of a hole in a reinforced concrete wall the drill bit engages a reinforcing rod, drilling through the rod woulud call for a slower rate of feed. In this instance, the feed rod of my drilling apparatus could be easily and simply taken out and replaced with another feed rod having threads of a smaller pitch. Thus, the bit would be advanced a smaller amount for each rotation of the bit. After the bit passed through the reinforcing rod, the appropriate feed rod could again be placed back in the drilling apparatus and work resumed. The same arrangement can be used to select the proper feed rate for the type of material being drilled. Harder materials would necessarily require the use of a slower feed than the softer materials. The drill bit apparatus of my invention also eliminates the difficult and tedious heavy work of manually feeding the drill. This manual feeding of the drill into the wall is particularly difficult if not dangerous when the operator is working from a scaffold, platform or the like. The new drill bit apparatus of my invention is safer to use and operate than drill bit apparatus known to the prior art. My drill bit apparatus is secured in place on a wall by a feed rod passing through an existing aperture in same. The drilling apparatus is thus positively secured in place and therefore is not likely to unbalance or throw a workman off a scaffold or platform if some mishap occurs, as for example if the drill bit freezes or lodges in the aperture in the wall. If such were to happen there is little likelihood that the workman would be pushed off the scaffolding or that apparatus fall on equipment or workmen below. My drill bit apparatus can be used in small confined spaces for drilling holes. Various lengths of feed rods can be used interchangeably as the bit bores its way through the wall. Further, my apparatus is adapted in use to maintain an accurate alignment with an existing hole in the wall. The feed rod passing through an existing aperture in the wall positively aligns the drill bit with same. Further, the tapered shape of the drill bit is self-aligning. In the event, that the existing aperture in the wall is much larger than the feed rod an auxiliary aligning means can be used to positively align the drill bit with same. The drill bit apparatus of my invention is relatively light in weight, yet is capable of boring large holes. The arduous hard work of feeding the bit into the wall is accomplished by the feed rod in combination with a suitable feed means. The feed means also acts as an anti-spall element in that it provides wall support as the cutting bit emerges from the opposite side of the wall. My drilling apparatus is relatively inexpensive to make and maintain since the parts can be easily produced or repaired in any well equipped machine shop. Further, my drilling apparatus is simple to use and maintain. Great strength is not a prerequisite in order to operate the apparatus. No elaborate training period is necessary in order to teach inexperienced help to use same.

The drill bit of my invention overcomes all of the problems associated with drill bits of the prior art. It is efficient, sturdy, inexpensive, and easy to maintain. It has a long cutting edge that is not likely to overheat and become ruined, as could happen with cutting bits having a small cutting edge having a concentrated cutting action. The long cutting edge remains sharp longer, thus prolonging the useful life of the bit making for less expensive operation. The cutting bit of my invention is provided with shallow grooves positioned between the cutting edges which efficiently remove the material cut from the wall as the aperture is being bored. The bit therefore is not likely to freeze or lodge in the aperture. My new cutting bit of my invention is simple and inexpensive to make and repair. The bit can be produced, or a new cutting edge installed in any well equipped machine shop or the like. My cutting bit by reason of its tapered, frusto conical shape will align itself and maintain this alignment with a hole or aperture being enlarged.

It is an object of this invention to provide a new drilling apparatus.

It is another object of this invention to provide a new cutting bit.

Still another object of this invention is to provide a masonry drilling bit apparatus for enlarging existing holes in a masonry wall or the like.

Yet another object of this invention is to provide a mountable drilling apparatus having a feed means.

Another object of this invention is to provide a drilling apparatus with an alignment means.

Another object of this invention is to provide a drilling apparatus having sectioned feed rods enabling it to operate in a confined space.

Yet another object of this invention is to provide a drilling apparatus that is safe and simple to operate.

Another object of this invention is to provide a drilling apparatus that is simple and inexpensive to produce and maintain.

Another object of this invention is to provide a drilling apparatus having a feed arrangement that can be adapted to varying rates of feed to suit various conditions encountered.

Yet another object of this invention is to provide a drill bit having a relatively long cutting edge disposed on a frusto-conical surface.

Still another object of this invention is to provide a drill bit that is self-cleaning and will not lodge or freeze in an aperture being drilled.

Another object of this invention is to provide a cutting bit that is simple and inexpensive to make and repair.

Another object of this invention is to provide a cutting bit that will maintain an alignment with a hole being enlarged.

Other objects and advantages of the invention will be apparent to those skilled in the art from the disclosure set forth herein.

Drawings of preferred specific embodiments of the invention accompany and are a part of this disclosure and such are to be understood to not unduly limit the scope of the invention. In the drawings, FIG. 1 is a side elevational view of a preferred specific embodiment of the masonry drill bit apparatus of my invention showing a power means operatively connected to same.

FIG. 5 is a side elevational view in cross section of another preferred specific embodiment of the cutting bit of my invention taken on line 5—5 of FIG. 1.

FIG. 6 is a view taken on line 6—6 of FIG. 5.

FIG. 7 is a front elevational view of another preferred specific embodiment of the cutting bit of my invention.

FIG. 8 is an end view of the cutting bit embodiment shown in FIG. 7.

FIG. 9 is another specific embodiment of a cutting bit of my invention.

FIG. 10 is an end view of the cutting bit illustrated in FIG. 9.

Figure 3:
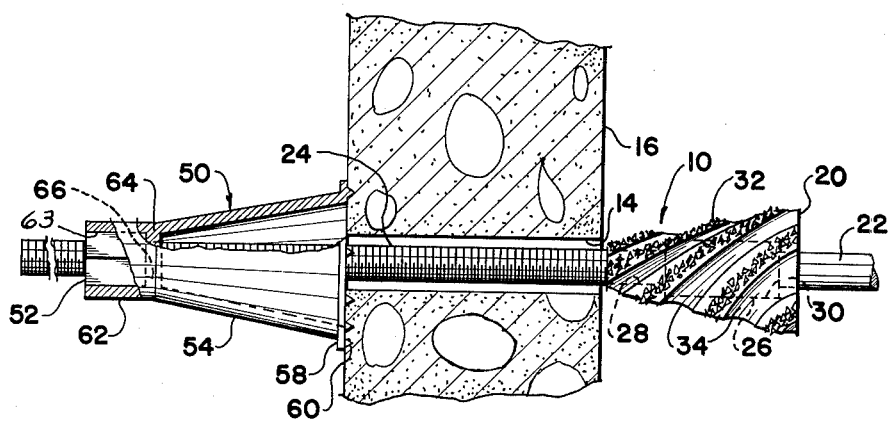
FIG. 3 is a side elevational view partly in cross section of another preferred specific embodiment of my drill bit apparatus.
Figure 2:
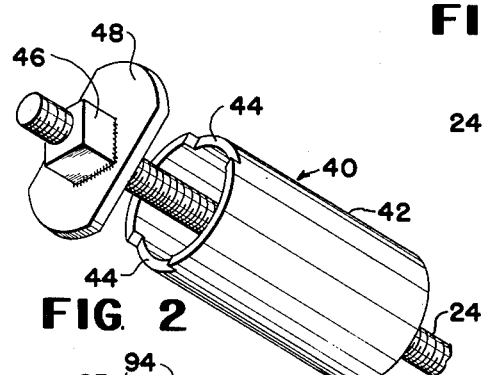
FIG. 2 is a perspective view of the feed means of a preferred specific embodiment of my invention.

The following is a discussion and description of the new drill bit apparatus and drill bit of my invention made with reference to the drawings on which the same reference numerals are used to indicate the same or similar parts and/or structure. The discussion and description is of preferred specific embodiments of the new masonry drill bit apparatus and drill bit of my invention and it is to be understood that such is not to unduly limit the scope of my invention.

Figure 12:
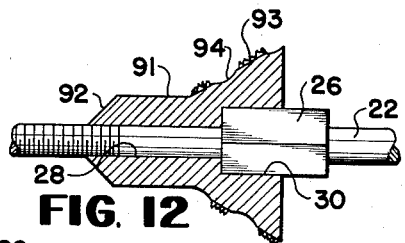
FIG. 12 is a side view in cross section of still another embodiment of my cutting bit.
Figure 13:
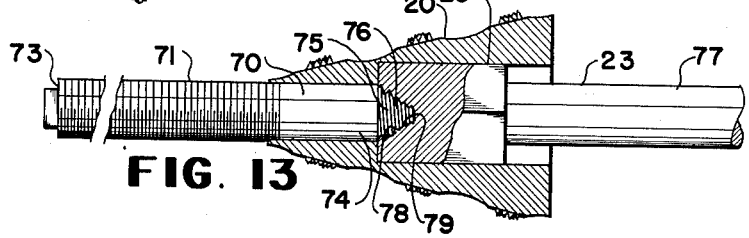
FIG. 13 is a side elevational view partly in cross section of the combination of a sectioned feed rod and cutting bit of my invention.

Referring now to the drawings, FIGS. 1-13, and FIG. 1 in particular the combination of a masonry drill bit apparatus 10 for use with a power drill 12 or the like for enlarging an existing aperture 14 in a masonry wall 16 is illustrated. The masonry drill bit apparatus 10 is adapted to guide and automatically feed a cutting means 20. My new drill bit apparatus has an elongated rod element 22 having a threaded feed portion 24 and a tang 26 having a non-circular transverse cross section. The type of threads on the feed portion 24 govern the rate of feed of the cutting bit. The finer the threads, the slower the feed rate. Any suitable thread size can be used. Preferably the threads are in the size range of 16 to 64 threads per inch. The tang 26 can have any suitable non-circular transverse cross section. The tang 26 shown is provided with a square transverse cross sectional shape. The cutting means 20 has a generally frusto-conical shape. Cutting means 20 has a longitudinally extending bore 28 of approximately the same diameter of said rod element 22 in the small end of the frusto-conical means. A relatively large longitudinally extending non-circular opening 30 or counterbore is provided in the opposite larger end of the frusto-conical means 20. The opening 30 has a transverse cross sectional shape similar to the transverse cross sectional shape of the tang 26. The tang 26 can extend in part beyond the boss shown in FIGS. 1 and 5 or can be completely enclosed in the cutting element 20 as shown in FIGS. 13 and 4. A plurality of spirally disposed rows of carbide particles 32 are fluxed to the exterior frusto-conical surface of cutting means 20 as shown in FIG. 5. The carbide particles fluxed or otherwise secured to the frusto-conical surface can be of any suitable size, preferably they are in the range of 3/32 to 1/8 inch across. The size of the carbide particles will depend on the type of material being drilled, the type available, the size of the power source, the rate of feed, etc. Of course, in drilling a monolithic concrete wall or a wall built up of concrete or cinder blocks, carbide particles over a substantially large range of size can be employed. Thus almost any type of carbide particles available can be employed.

One practicing the invention should keep in mind that generally it is advisable to have available a relatively great source of power if the carbide particles are large and present relatively greater protuberance. Also a relatively large power source should be available if one desires to feed the new drill bit of my invention at substantial speed.

Between the rows of carbide particles are provided shallow spirally disposed grooves 34. The grooves 34 provide in use a convenient avenue of escape of the material cut from the masonry wall or the like. My drill bit apparatus includes an automatic feed means 40 consisting of a generally cylindrically shaped element 42 having open ends. It is preferred that the inside diameter of element 42 be only slightly larger than the major diameter of the cutting bit 20. This relationship provides the rear side of wall 16 with a firm support which prevents cracking as the cutting bit emerges. On one end of element 42 are provided diametrically opposed shallow recesses 44. A threaded nut means 46, which threads are adapted to operatively engage the threaded feed portion 24 of elongated rod 22, and a flat elongated member 48 having a centrally disposed aperture are welded together with the aperture and the threaded aperture of the nut means 46 in alignment. The ends of flat member 48 fit into the diametrically opposed recesses 44 in element 42. Drill bit apparatus 10 when in assembled relation with elongated rod 22 disposed through an aperture 14 in a wall 16, cutting means 20 disposed on tang 26, cylindrically shaped element 42 disposed over rod element 22 on the side of wall 16 opposite the cutting means 20, and threaded nut 46 and elongated member 48 disposed in shallow recesses 44 in cylindrical element 42 is adapted, when rotated by a suitable power drill 12 or the like to automatically guide and feed the cutting element 20 to thereby enlarge an existing aperture in the wall.

Figure 4:
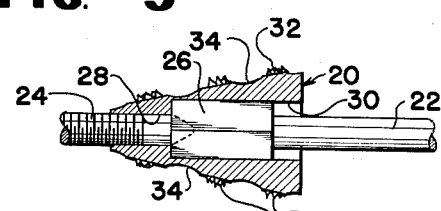
FIG. 4 is a side elevational view in cross section of a preferred specific embodiment of the cutting bit of my invention.

Referring now to FIG. 3, there is shown another specific embodiment of the preferred masonry drill of my invention. The masonry drill apparatus 10 shown in FIG. 3 has an elongated rod element 22 having a threaded feed portion 24, and a tang 26 having a non-circular transverse cross section. The tang can have any suitable non-circular transverse cross sectional shape. A generally frusto-conical shaped cutting means 20 is provided having a longitudinally extending bore 28 of approximately the same diameter as said rod element 22 in the small end of said cutting means 20. A relatively large longitudinally extending non-circular opening 30 or counterbore is provided in the large end of said cutting means 20. The opening 30 has a transverse cross sectional shape similar to the transverse cross sectional shape of tang 26. The cutting means 20 is provided with a plurality of spirally disposed rows 32 of carbide particles secured to the exterior frusto-conical surface. Shallow spirally disposed grooves 34 are provided between the rows 32 of carbide particles. An automatic feed means 50 is disposed on the feed rod 22. It has a threaded nut means 52 adapted to threadedly engage the threaded feed portion 24 of elongated rod 22, and an annular means 54 having a hollow frusto-conical shaped end having a frusto-conical shaped cavity therein. The frusto-conical cavity should be large enough to receive the tapered cutting bit 20 as it emerges from the rear side of the wall. The size should not be so large that it does not provide a support to prevent cracking of the wall. The frusto-conical portion 54 has a flange portion 58 on the end thereof. Pointed longitudinally extending projections 60 are disposed on the flange portion 58 and are adapted to bite or dig into the wall 16 preventing it from rotating as rod 22 is rotated. A longitudinally extending non-circular cavity 63 adapted to receive the non-circular surface portion of the nut means 52 is provided. An abutment means 64 intermediate the frusto-conical portion 54 and the cylindrical portion 62 and having a concentrically longitudinally extending bore 66 therethrough supports nut 52 in spaced relation from wall 16 when the apparatus is in operation. The drill bit apparatus 10 when assembled with the feed rod 22 disposed in aperture 14 in a wall 16, cutting means 20 disposed on tang 26, annular means 50 disposed over the rod element 22 on the side of the wall opposite cutting means 20, and with nut means 52 disposed in the non-circular cavity 63 of the annular means 50, is adapted when rotated by a suitable power drill or the like to automatically guide and feed the cutting means 20 to thereby enlarge an existing aperture in a wall 16.

The two aforedescribed masonry drill apparatus can be provided with a sectioned elongated rod 23 if desired. This type of sectioned rod construction is shown in FIG. 13. A sectioned rod of the construction shown in FIG. 13 enables the drilling apparatus to be more versatile. The sectioned rod construction can be used to enable the drilling apparatus to be used in confined spaces wherein space would not ordinarily permit the use of a unitary rod, or to conveniently change the feed rate of the drilling apparatus. As shown in FIG. 13 the sectioned rod means 23 consists of a first rod portion 70 having feed threads 71 disposed thereon extending from a first end portion 73 and terminating short of the second opposite end 74. On end 74 is provided a longitudinally extending tapered portion 75 having relatively coarse threads 76. Rod 23 includes a second rod portion 77 having a parallelepiped shaped tang 26 on one end of said second rod portion 77. At one end of tang 26 is provided a tapered longitudinally extending aperture 78 having relatively coarse threads 79 therein. The tapered threaded portion 75 on rod portion 70 is adapted to be disposed in the tapered threaded aperture 78 in second rod portion 77 to thereby removably secure the two portions of rod 23 in engagement. As will be obvious to those skilled in the art, the rod portion 70 can quickly and easily be disconnected from rod portion 77. Any suitable connecting means may be substituted for the tapered threaded portion and tapered threaded aperture shown. As for example, a bayonet joint connecting means could be substituted for the aforementioned connecting means. In use, the threaded feed rod portion 70 can be easily and quickly disconnected from the cutting means and rod portion 77 and another replaced thereon. It is desirable that such a change can be accomplished when the feed rate of the drilling bit apparatus must be changed, as for example when the cutting bit strikes a reinforcing rod or the like, or when the apparatus is used in a confining space and the elongated rod must be added in sections to enable the apparatus to be set up and used in the confined space. The sectioned rod just described can be used with any of the cutting bit embodiments of my invention.

One of the specific embodiments of my cutting bit has been described in combination with the masonry drill apparatus embodiments shown in FIGS. 1 and 3. The previously described cutting bit embodiment is shown in FIGS. 4, 5, and 6. As was previously mentioned, the tang 26 can be completely enclosed in opening 30 as shown in FIG. 4 or only partially enclosed as shown in FIG. 5. Another specific embodiment of the cutting bit of my invention is depicted in FIGS. 9 and 10. The cutting bit 80 consists of a generally frusto-conial element having a longitudinal bore 28 and a non-circular longitudinally extending opening 30 in the rear large end of the frusto-conical element 80. A plurality of lengthwise extending rows 81 of carbide particles fluxed to the frusto-conical surface thereof are provided. The sizes of the particles can be of any suitable size. More preferably the size of the carbide particles are in the range of 3/32 to 1/8 inch across. Disposed between the lengthwise extending rows 81 of carbide particles are lengthwise extending grooves 82. Any convenient number of rows or carbide particles can be provided. I have found that four lengthwise extending rows of carbide particles works quite well.

Figure 11:
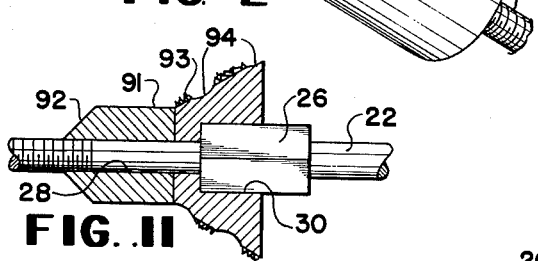
FIG. 11 is a side view in cross section of another specific embodiment of the cutting bit of my invention.

Still another specific embodiment of my cutting bit is depicted in FIGS. 7 and 8. The cutting bit 85 has a forward frusto-conical portion 86 and a rear cylindrical portion 87 integrally joined, with the diameter of the rear portion 87 being that of the major diameter of the frusto-conical portion 86. A plurality of lengthwise extending rows of carbide particles 88 are provided on the exterior surface of the front and rear portions 86 and 87 thereof. Shallow lengthwise extending grooves 89 are disposed between the rows 88 of carbide particles. Still another specific embodiment of the cutting bit of my invention is shown in FIGS. 11 and 12. This embodiment of cutting bit has a central bore 28 and a longitudinally extending non-circular opening 30. A tubular alignment portion 91 having a central bore and a tapered portion 92 on the forward end thereof is provided. The tubular alignment portion can be a separate part of the cutting bit as shown in FIG. 11 or can be integrally joined with the cutting portion as shown in FIG. 12. The alignment portion is useful when a hole much larger than the elongated rod is enlarged. This could occur when more than a single pass of the cutting bit is used to produce an exceedingly large hole. In practice the hole can be enlarged by using progressively larger cutting bits on each subsequent pass. The cutting means of the cutting bit consists of a plurality of rows of carbide particles 93 which can be either spirally disposed or longitudinally extending. The pitch of the spirally disposed carbide rows can be any suitable pitch. A moderate pitch of the type shown in the drawing figures is preferred. Relatively shallow grooves 94 are provided between the rows of carbide particles.

The cutting bit of my invention can be made in any suitable manner or fashion. The element can be made of any suitable metal or material, preferably of iron alloy. The cutting edge, namely particles, preferably carbide particles can be conveniently secured to the element by first heating the surface until powdered Eutector Flux No. 16–D flows evenly over the surface. Then the surface is additionally heated to a temperature between 1400 to 1600 degrees F., at which temperature a Eutectic welding rod 16–FC can be flowed onto the surface thereof. The metal thus flowed will be the matrix which holds the carbide particles to the element. The carbide particles are then affixed on the element surface using a Eutectic rod No. 88 which has carbide particles dispersed through a carrier alloy forming the rod. The frusto-conical shaped element can be machined or cast in the suitable and appropriate size and the particles affixed to same.

The cutting edge means can be any suitable type of hard tough particles. Preferably, the particles are carbide particles although conceivably other types of particles can be used, as for example diamond particles.

As will be obvious to those skilled in the art, various changes and modifications of the preferred drill bit appartus and drill bit of my invention disclosed herein can be made or followed without departing from the spirit of the disclosure or from the scope of the claims.

Having thus described the invention, what is claimed as new and desired to be secured by Letters Patent is:

1. A masonry drill bit apparatus for use with a power drill or the like for enlarging an existing aperture in a masonry wall that is adapted to guide and automatically feed a cutting means comprising, an elongated rod element, a threaded feed portion on said rod element, a tang on said rod element having a non-circular transverse cross section, a generally frusto-conical shaped cutting means having a longitudinally extending bore of approximately the same diameter as said rod element in the small end of said frusto-conical cutting means, a relatively large longitudinally extending non-circular opening in the opposite larger end of said frusto-conical cutting means having a transverse cross sectional shape similar to said transverse cross sectional shape of said tang, a plurality of spirally disposed rows of carbide particles fluxed to the exterior frusto-conical surface of said cutting means, shallow spirally disposed grooves between said rows of carbide particles, said cutting means disposed over said rod element and said tang, an automatic feed means comprising, a generally cylindrically shaped element having open ends, and an inside diameter only slightly greater than the major diameter of said frusto-conical cutting means, diametrically opposed shallow recesses in a first end of said cylindrically shaped element, a threaded nut means which threads are adapted to operatively engage said threaded feed portion of said rod, an elongated flat member having a centrally disposed aperture welded to said threaded nut with said aperture and threaded aperture of the nut means in alignment, said drill bit apparatus when in assembled relation with said elongated rod disposed through an aperture in a wall, said cutting means disposed on said rod and said tang, said cylindrically shaped element disposed over said rod element on the side of a wall opposite said cutting means, and said threaded nut and elongated member disposed in said shallow recesses on said cylindrically shaped element adapted, when rotated by a suitable power drill or the like to automatically guide and feed said cutting element to thereby enlarge an existing aperture in the wall.

2. A masonry drill bit apparatus for use with a power drill or the like for enlarging an existing aperture in a masonry wall that is adapted to guide and automatically feed a cutting means comprising, an elongated rod element, a threaded portion on said rod element, a tang on said rod element having a non-circular transverse cross section, a generally frusto-conical shaped cutting means, a longitudinally extending bore of approximately the same diameter as said rod element in the small end of said cutting means, a relatively large longitudinally extending non-circular opening in the opposite larger end of said cutting means having a transverse cross sectional shape similar to said transverse cross sectional shape of said tang, a plurality of spirally disposed rows of carbide particles secured to the exterior frusto-conical surface of said cutting means, shallow spirally disposed grooves between said rows of carbide particles, said cutting means being disposed over said rod element and said tang, an automatic feed means comprising, a generally cylindrically shaped element having open ends, diametrically opposed shallow recesses in a first end of said cylindrically shaped element, a threaded means which threads are adapted to operatively engage said threaded rod portion, an oblong flat member having a centrally disposed aperture secured to said threaded means with said aperture and threaded aperture of the threaded means in alignment, said drill bit apparatus when in assembled relation with said elongated rod disposed through an aperture in a wall, said cutting means disposed on said elongated rod element and said tang, said cylindrically shaped element disposed over said rod element on the side of a wall opposite said cutting means and said threaded means and oblong member disposed in said shallow recesses on said cylindrically shaped element adapted when rotated by a suitable power drill or the like, to automatically guide and feed said cutting element to thereby enlarge an existing aperture in the wall.

3. A masonry drill bit apparatus for use with a power drill or the like for enlarging an existing aperture in a masonry wall that is adapted to guide and automatically feed a cutting means comprising, an elongated rod element, a threaded feed portion on said rod element extending from a first end over a major portion of said rod terminating short of second opposite end, a tang on said rod element spaced a relatively short distance from said second end having a square transverse cross section configuration and flat transverse end surfaces, said second end of said rod element adapted to be removably secured in the chuck of a power drill or the like, a generally frusto-conical shaped cutting means, a longitudinally extending bore of approximately the same diameter as said rod element in the small end of said frusto-conical cutting means, a relatively large longitudinally extending opening in the opposite larger end of said frusto-conical cutting means having a square cross sectional shape similar in size to the square cross sectional configuration of said tang, a plurality of spirally disposed rows of carbide particles fluxed to the exterior frusto-conical surface of said cutting means, shallow spirally disposed grooves between said rows of carbide particles, said cutting means being disposed on said rod element and said tang, and automatic feed means comprising, a threaded nut means adapted to threadedly engage said threaded feed portion to said elongated rod, a non-circular exterior surface portion on said nut means, an annular means to hold said nut means comprising a hollow frusto-conical shaped end portion, said end portion having an open end and a frusto-conical shaped cavity therein, a flange portion on said end portion, pointed longitudinally extending projections on said flange portion, a cylindrical longitudinally extending opposite end portion, a longitudinally extending non-circular cavity in said opposite end portion adapted to receive said non-circular surface portion of said nut means, an abutment means intermediate said frusto-conical end portion and said cylindrical portion having a concentric longitudinally extending bore therethrough, said drill bit apparatus when in assembled relation with said elongated rod disposed through an aperture in the wall, said cutting means disposed on said elongated rod and said tang, said annular means disposed over said rod element on the side of the wall opposite said cutting means, said nut means disposed in said non-circular cavity in said annular means with said threaded nut operatively engaging said threaded feed portion on said rod element adapted, when rotated by a suitable power drill or the like, to automatically guide and feed said cutting means to thereby enlarge an existing aperture in a wall.

4. A masonry drill bit apparatus for use with a power means for enlarging an existing aperture in a masonry wall that is adapted to guide and automatically feed a cutting means comprising, an elongated rod element having a threaded end portion thereon, a tang on said rod element disposed intermediate the ends of said rod, said tang having a non-circular transverse cross sectional configuration, an automatic feed means comprising, a threaded nut means adapted to threadedly engage said threaded portion of said elongated rod, a non-circular exterior surface configuration on said nut means, a means to engage said nut means having a hollow frusto-conical shaped portion, said means to engage said nut means having means adapted to cooperate with said non-circular exterior portion of said nut to hold said nut from rotation and an abutment means for said nut means on the small end of said frusto-conical shaped portion having an aperture receiving said rod, a generally frusto-conical shaped cutting means, a longitudinally extending bore in said cutting means, a relatively large longitudinally extending opening in one end of said cutting means adapted to receive said tang, a plurality of spirally disposed rows of carbide particles secured to the exterior frusto-conical surface of said cutting means, shallow spirally disposed grooves between said rows of carbide particles, said drill bit apparatus in assembled relation with said elongated rod disposed through an aperture in the hole in the wall, said cutting means disposed on said rod and said tang, said means to engage the nut means disposed over said rod element on the side of the wall opposite said cutting means, said nut means operatively engaging said threaded portion of said rod element adapted, when rotated by a suitable power means, to automatically guide and feed said cutting elment to thereby enlarge an existing aperture in a wall.

5. A masonry drill bit apparatus for enlarging an existing aperture in a masonry wall that is adapted to guide and automatically feed a cutting means comprising, an elongated section rod means comprising, a first rod portion, feed threads disposed on said first rod portion extending from a first end portion and terminating short of a second end, a longitudinally extending tapered portion on said second end, relatively coarse threads on said tapered portion, a second rod portion, a tang on an end of said second rod portion, a tapered longitudinally extending aperture provided with relatively coarse threads disposed in said tang adapted to receive and removably secure said tapered threaded portion of said first rod portion to said second rod portion, a generally frusto-conical shape cutting means, a longitudinally extending bore in said cutting means to receive said first rod portion, a relatively large longitudinally extending non-circular opening in the larger end of said cutting means adapted to receive said tang, a plurality of rows of carbide particles secured to the exterior frusto-conical surface of said cutting means, shallow disposed grooves between said rows of carbide particles, a feed means comprising a threaded nut means adapted to threadedly engage said feed threads on said first rod portion, a means to rigidly support said threaded nut means relative to the surface of a wall having means to engage said nut means and the wall to prevent said nut means from rotation, said drill bit apparatus in assembled relation with said cutting means on one side of a wall and the means to support the nut on the opposite side adapted to automatically guide and feed said cutting element to thereby enlarge an existing aperture in a wall upon turning said rod means.

6. A masonry drill bit apparatus for enlarging an existing aperture in a masonry wall that is adapted to guide and automatically feed a cutting means, comprising, an elongated sectioned rod means, comprising, a first rod portion, feed threads disposed on said first rod portion, a longitudinally extending portion on an end of said first rod portion, a second rod portion, a tang means having a non-circular cross-section on an end of said second rod portion, a longitudinally extending aperture disposed in said tang, engagement means on said first rod portion and in said aperture to removably secure said first and second rod portions in aligned relationship, a generally frusto-conical shaped cutting means, said cutting means having a longitudinally extending bore, a relatively large longitudinally extending non-circular counterbore to matingly receive said tang means, at least one row of carbide particles secured to the frusto-conical surface of said cutting means, shallow grooves disposed parallel to said row of carbide particles, a feed means for said cutting means comprising, a threaded means adapted to threadedly engage said feed threads on said first rod portion, a means to support said threaded means relative to a wall having means to engage said wall to prevent said threaded means from rotation, said drill apparatus when in assembled relation with said cutting means on one side of a wall and the means to support said threaded means on the opposite side adapted to automatically guide and feed said cutting means to thereby enlarge an existing aperture in a wall upon turning said rod means.

7. A drill apparatus for enlarging an existing aperture that is adapted to guide and automatically feed a cutting means comprising, an elongated rod, feed threads on one end of said rod, a tang means on the intermediate portion of said rod having engagement means therewith, a generally frusto-conical shaped cutting means having a longitudinally extending bore receiving said rod, a longitudinally extending counterbore in said cutting means in the large end thereof receiving said tang means and having engagement means therewith adapted to engage said engagement means of said tang to turn therewith, at least one row of carbide particles secured to the surface of said cutting means, and at least one shallow groove on the surface of said cutting means, a feed means in engagement with said rod comprising a threaded means adapted to threadedly engage said feed threads on said rod, and an enlarged support in engagement with said threaded means having means in contact with said threaded means and means for engaging the surface of a wall or the like being drilled upon turning said rod to prevent said threaded means from rotation.

8. The structure of claim 7 wherein said cutting means is provided with a plurality of spirally disposed rows of carbide particles fluxed to the exterior surface thereof, the size of said particles being in the range of $3/32$ to $1/8$ inch and shallow grooves disposed between said rows of carbide particles.

9. The structure of claim 7 wherein said cutting means is provided with a plurality of lengthwise extending rows of carbide particles fluxed to the frusto-conical surface thereof, the size of said particles being in the range of $3/32$ to $1/8$ inch, and shallow lengthwise extending grooves disposed between said rows of carbide particles.

10. The structure of claim 7 wherein said cutting means is comprised of a forward frusto-conical portion and a rear cylindrical portion integrally joined, the diameter of said rear portion being that of the major diameter of said frusto-conical portion, a plurality of lengthwise extending rows of carbide particles secured on the exterior surface of said cutting means, the size of said particles being in the range of $3/32$ to $1/8$ inch, and shallow lengthwise extending grooves disposed between said rows of carbide particles.

11. The structure of claim 7 wherein said cutting means includes an alignment means comprising a tubular portion having a central bore adapted to receive said rod, and a tapered portion on the forward end thereof, said alignment means positioned on the forward smaller end of said frusto-conical cutting means.

12. A cutting bit for enlarging an existing aperture in a masonry wall or the like comprising, a generally frusto-conical element, a longitudinal bore in said element, a non-circular longitudinally extending counterbore in the rear large end of said frusto-conical element, a plurality of spirally disposed rows of carbide particles fluxed to said element, the size of said particles being in the range of $3/32$ to $1/8$ inch, and relatively shallow spirally disposed grooves between said rows of carbide particles.

13. A cutting bit for enlarging an existing aperture in a masonry wall or the like comprising, a generally frusto-conical element, a longitudinal bore in said element, a non-circular longitudinally extending counterbore in the rear large end of said frusto-conical element, a plurality of lengthwise extending rows of carbide particles fluxed to the frusto-conical surface thereof, the sizes of said particles being in the range of $3/32$ to $1/8$ inch, and shallow lengthwise extending grooves disposed between said rows of carbide particles.

14. A cutting bit for enlarging an existing aperture in a masonry wall or the like comprising, a forward frusto-conical portion and a rear cylindrical portion integrally joined, the diameter of said rear portion being that of the major diameter of said frusto-conical portion, a longitudinal bore in said bit, a non-circular opening in the end of said rear portion, a plurality of lengthwise extending rows of carbide particles on the exterior surface of said forward and rear portions thereof, the size of said particles being in the range of $3/32$ to $1/8$ inch, and shallow lengthwise extending grooves disposed between said rows of carbide particles.

15. A cutting bit for enlarging an existing aperture in a masonry wall or the like, comprising, a tubular alignment portion having a central bore, and a tapered portion on the forward end thereof, a generally frusto-conical rear cutting portion, a longitudinal bore in said rear portion, a non-circular opening in the rear large end of said frusto-conical rear portion, a plurality of rows of carbide particles fluxed to the surface of said frusto-conical rear portion, the size of said particles being in the range of $3/32$ to $1/8$ inch, and relatively shallow spirally disposed grooves between said rows of carbide particles.

16. A drilling apparatus comprising, an elongated drive member having means on one end portion to advance said member upon turning same and a cutting bit mounted on a central portion to turn therewith, said cutting bit being tapered inwardly and forwardly and having spaced cutting edges therealong, a means to advance said drive member and cutting bit into material being drilled, said means to advance having a portion in engagement with said means on said rod to advance same, and an abutment surface located between said portion in engagement with said means on said rod to advance same and said cutting bit, said apparatus constructed and adapted in use to enlarge existing apertures in a wall or the like when said elongated drive member is inserted through the aperture with the cutting bit in engagement with one side thereof, the means to advance operatively engaged to said means on said drive member to advance same on the opposite side thereof, and the elongated drive member rotated.

17. A cutting bit or masonry or the like comprising, a generally frusto-conical element, a longitudinal bore in said element, an enlarged non-circular opening in the base end portion of said frusto-conical element, said opening constructed and adapted to matingly, non-rigidly and easily removably receive drive means and having portions to engage said drive means to rotate therewith when mounted on same, a plurality of rows of carbide particles of random size and randomly spaced in said rows secured to the surface of said element, shallow grooves on the surface of said element between adjacent rows of carbide particles.

References Cited by the Examiner
UNITED STATES PATENTS

| 714,631 | 11/02 | Barnes | 77—2 |
| 1,079,689 | 11/13 | Bowler et al. | 175—406 X |
| 1,139,529 | 5/15 | Hughes | 175—408 X |
| 1,343,517 | 6/20 | Champion et al. | 77—2 |
| 1,391,626 | 9/21 | Gilthrope | 175—319 X |
| 2,493,178 | 1/50 | Williams | 175—329 |

CHARLES E. O'CONNELL, *Primary Examiner.*

BENJAMIN BENDETT, *Examiner.*